T. J. JONES.
NUT LOCK.
APPLICATION FILED FEB. 18, 1910.

965,633. Patented July 26, 1910.

WITNESSES:

INVENTOR
Thomas J. Jones.
BY
ATTORNEY

UNITED STATES PATENT OFFICE.

THOMAS J. JONES, OF TRUMBULL COUNTY, OHIO.

NUT-LOCK.

965,633.  Specification of Letters Patent.  Patented July 26, 1910.

Application filed February 18, 1910. Serial No. 544,673.

*To all whom it may concern:*

Be it known that I, THOMAS J. JONES, citizen of the United States, residing in the county of Trumbull and State of Ohio, have invented certain new and useful Improvements in Nut-Locks, of which the following is a specification.

My invention relates to bolts and the combination with bolts of means for preventing the loosening of the nuts; this invention is directed to that class of bolts having lock nuts thereon on which the threaded end is provided with right and left hand screw threads, and has for its object, means for preventing the accidental loosening of the nuts.

A further object is to provide means interacting between the nut on the right hand thread and the nut on the left hand thread for preventing the independent turning of these nuts.

A still further object is to supply a locking means that requires no special form of nut and which are locked without any special appliances.

Further objects and purposes of my invention will appear from an inspection of the drawings, the specifications describing the same, and the claims appended thereto, in which are set forth the features of construction, combination of elements, and arrangement of parts, properly comprised within the scope of the same.

Figure 1:
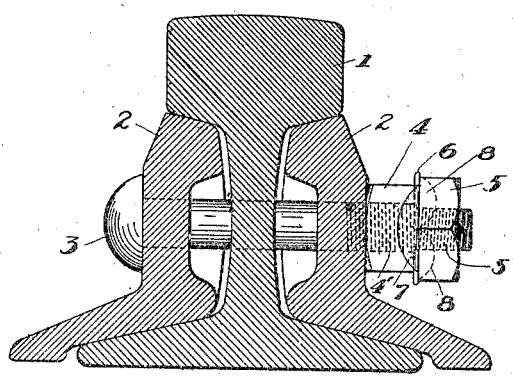
Figure 2:
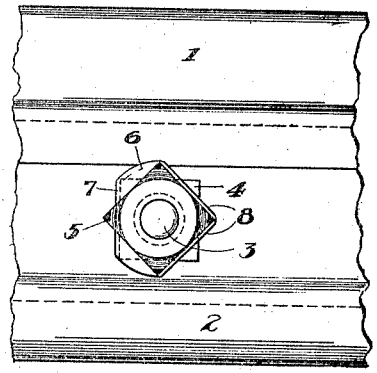
Figure 3:
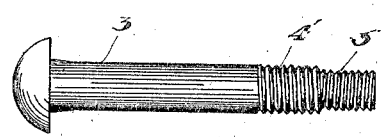
Figure 6:
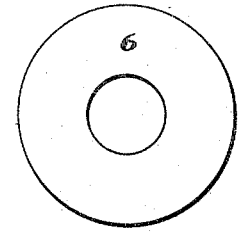
Figure 4:
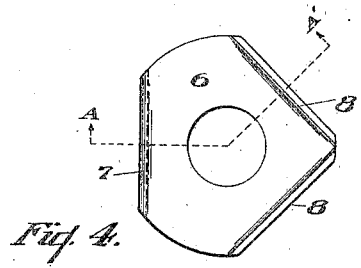
Figure 5:
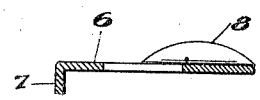

In the drawing in which is illustrated one of the possible embodiments of my invention; Figure 1 shows a right and left hand threaded bolt with nuts thereon and my locking washer interposed between the nuts, the bolt and nuts being shown in a side view and in connection with a rail and fish plates which are shown in vertical cross section. Fig. 2 is a front view looking at the nuts and washer as applied to the bolt in Fig. 1. Fig. 3 shows the conventional form of a right and left hand threaded bolt such as used in carrying out my invention. Fig. 4 is my washer showing its edges turned up at the points required to retain the nuts when positioned as shown in Figs. 1 and 2. Fig. 5 is a vertical cross sectional view of my washer as shown in Fig. 4. Fig. 6 shows the ordinary form of the washer before the edges are bent to lock the nuts.

Referring now to the several figures as above described in which like reference characters designate like parts, (1) is a conventional form of T rail and (2) fish plates used at the joints of such rails.

(3) represents the bolt and head, the right hand thread at (4'), and a reduced left hand section at (5').

(4) is a threaded nut adapted to screw on the enlarged threaded section and 5, a nut with threads corresponding to (5') and adapted to screw on the reduced portion.

My locking means is an ordinary metallic washer (6), the diameter of which, however, should be equal or greater than the lengths of a diagonal line drawn between the opposite corners of the nuts. This disk or washer has a circular aperture in it sufficiently large to pass freely over the larger threaded section 4'. The washer is made from some tough metal and should possess no resiliency, a zinc compound preferably entering into its composition.

Owing to the difference in diameter of the threaded sections, the relation of the sides of the nuts to each other will vary according to the ultimate position of the inner nut, and inasmuch as it is necessary to lock nuts whether their sides be flush or not, my invention is so adapted as to be capable of locking nuts whenever they are tight against each other, and irrespective of the relative position of the side faces.

When, in tightening the nuts, the inner and outer nuts bear the relation toward each other as shown in Figs. 1 and 2, the edge of the washer is hit with any hammer or other tool and bent down upon the inner nut, as shown at (7); a blow outward on the opposite side of the washer will turn the edge up to embrace a side of the outer nut as shown at (8). This simple operation with my invention rigidly locks the nuts in respect to each other and prevents their accidental unscrewing. Moreover, the very simplicity of the device is such that makes it unnecessary to provide specially designed nuts or special tools for locking the same; and as an inspection of the drawings will disclose, my device is equally operative and valuable in any position the nuts may bear relative to each other.

I am well aware of the prior art in which is disclosed means interposed between the nuts on a right and left hand threaded bolt for locking the nuts, but I claim as new, the means operative without a special structure of the nuts to lock the nuts in whatever position they may be in respect to each other.

Having thus described my invention, what I claim as new and desire to secure by Letters Patent, is;

1. In combination, a bolt having at one end a right hand threaded section and a left hand threaded section, nuts correspondingly threaded and screwed on said bolt and means interposed between said nuts for locking the nuts in any position relative to each other, said means comprising a circular washer having a diameter greater than the longest measurement of the nut face and having a single aperture therein, substantially as shown and described.

2. The combination of a right and left hand threaded bolt, nuts screwed thereon, and a metallic locking member located on said bolt between the nuts and adapted to prevent the movement of the nuts relative to each other, said member being operative in any position of the nuts in respect to each other and comprising a circular washer having a single aperture therein, substantially as shown and described.

3. The combination of a right and left hand threaded bolt, nuts applied thereto, a plain washer of a relatively large diameter interposed between the nuts, said washer being bent in one direction to embrace a side of one of the nuts, and in the opposite direction, to embrace a side of the other nut, whereby the nuts are locked relatively to each other in whatever position they occupy in respect to each other, substantially as shown and described.

4. In combination, a bolt having a head at one end and a right hand threaded section at the other end, a reduced left hand threaded section integral with said bolt and located exteriorly of the right hand section, a threaded nut screwed upon the right hand threaded section, a second nut screwed upon the exterior section, a plain metallic non-resilient washer of relatively large diameter interposed between the two nuts, and flanges on said washer bent in opposite directions and embracing one or more sides of each nut, whereby the nuts are locked in any position relative to each other, substantially as shown and described.

In testimony whereof I affix my signature in presence of two witnesses.

THOMAS J. JONES.

Witnesses:
RALPH W. EWING,
EUGENE E. ANDERSON.